Aug. 25, 1964     C. B. TRIMBLE     3,146,352
ELECTRO-OPTICAL MULTIVIBRATOR USING ELECTROLUMINESCENT
AND PHOTOCONDUCTIVE ELEMENTS
Filed May 18, 1962     5 Sheets-Sheet 1
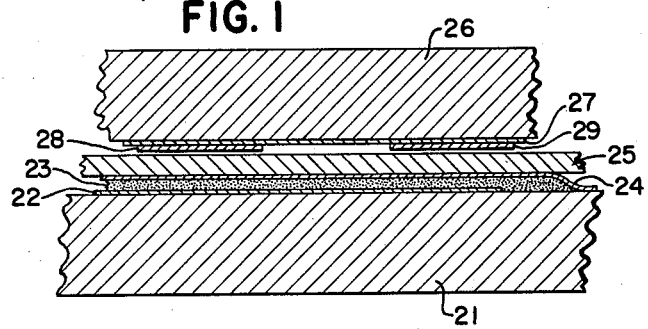
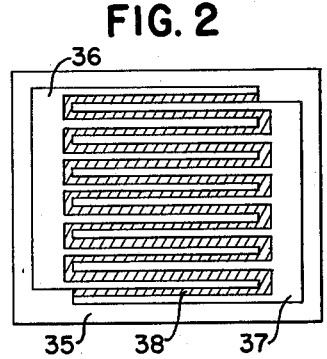
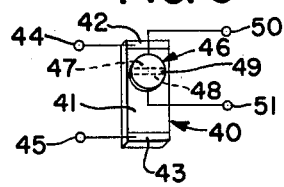
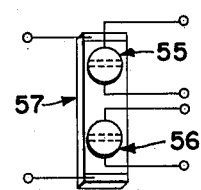
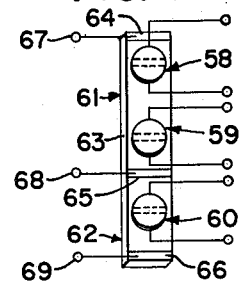
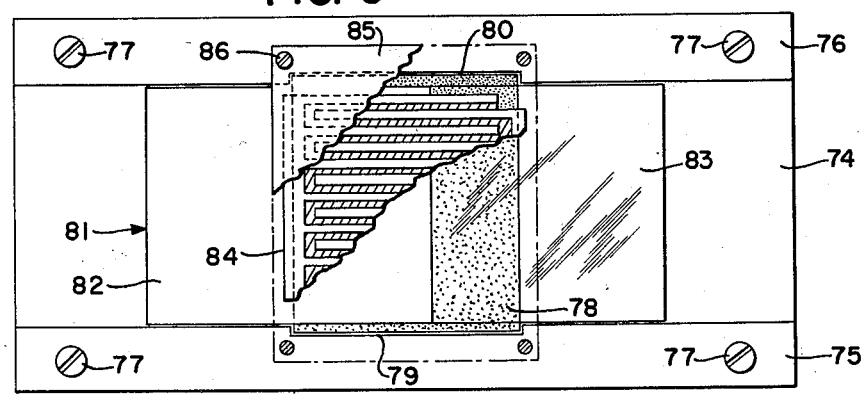
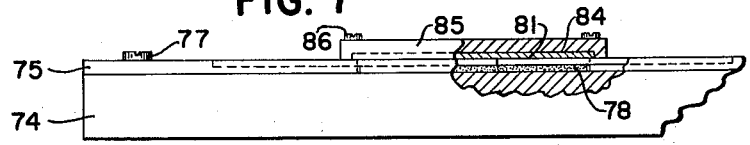
INVENTOR
CEBERN B. TRIMBLE
BY
HIS ATTORNEYS

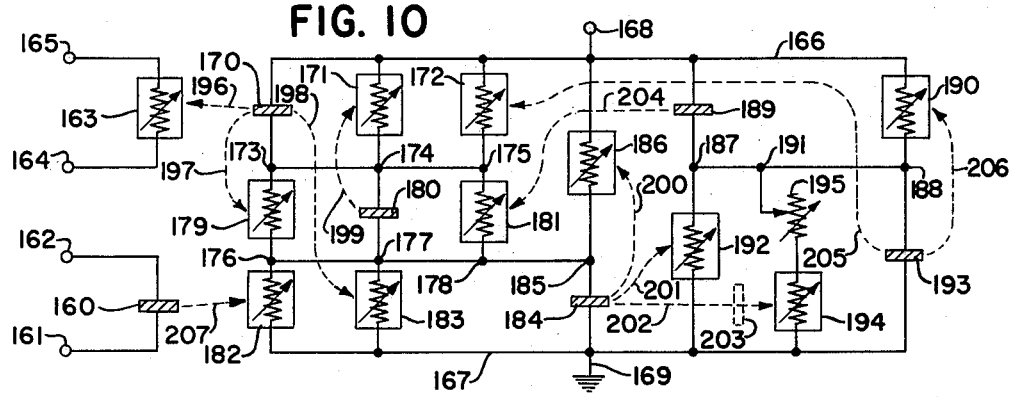

INVENTOR
CEBERN B. TRIMBLE

United States Patent Office 3,146,352
Patented Aug. 25, 1964

3,146,352
ELECTRO-OPTICAL MULTIVIBRATOR USING ELECTROLUMINESCENT AND PHOTOCONDUCTIVE ELEMENTS
Cebern B. Trimble, Dayton, Ohio, assignor to The National Cash Register Company, Dayton, Ohio, a corporation of Maryland
Filed May 18, 1962, Ser. No. 195,796
14 Claims. (Cl. 250—209)

This invention relates generally to multivibrator circuits, and more particularly relates to electro-optical implementations of such circuits.

Electro-optical circuitry is of interest in a large number of different applications, such as, for example, in data-processing systems, for such reasons as potential low cost, ease of fabrication, and electrical isolation between optically-coupled elements. The subject of the present invention is a one-shot multivibrator, which is fabricated from electro-optical elements and which, in certain embodiments, provides a variable time delay.

In the present invention, radiation-emissive materials, such as electroluminescent elements, are coupled to detectors, such as photoconductive elements, in such manner that an electrical input signal applied to the electroluminescent element causes radiation, which radiation impinges on the photoconductive element to change its operating characteristics.

Electroluminescence is a well-known property of certain phosphors, which causes them to emit radiation when excited by a change in potential gradient across the phosphors. Other suitable types of radiation-emissive components, such as neon glow tubes, for example, may be used in the present invention in place of the electroluminescent phosphors.

As is also well known, illumination of a photoconductive element greatly affects the electrical internal resistance of such an element. An element which is dark has a very high resistance, while one which is illuminated by suitable radiation has a relatively low resistance. Other components which are capable of changing certain physical or electrical characteristics upon exposure to radiation, such as photodiodes, phototransistors, solar cells, bolometers, etc., could be used in the present invention.

In accordance with the present invention, an output, which may be selectively varied in duration in certain embodiments, is produced by a one-shot multivibrator comprising a combination of photoconductive elements and electroluminescent elements combined and optically coupled to function according to a predetermined sequence of operation. This operating sequence provides precise timing for the rise and fall of the output signal from the one-shot multivibrator. In the case of those embodiments capable of producing an output signal of variable duration, this is accomplished by the provision of means including, in different embodiments, means for varying the effective area of the photoconductive elements exposed to radiation, means for varying the intensity of the radiation applied to the photoconductive elements, and means including a variable resistance and two photoconductive elements having substantially different response times.

It is accordingly an object of the present invention to provide an electro-optical multivibrator of simple, efficient design.

Another object is to provide an electro-optical one-shot multivibrator having a variable time delay.

A further object is to provide an electro-optical one-shot mutivibrator in which a plurality of photoconductive elements of differing response times are utilized to provide a variable time delay.

An additional object is to provide an electro-optical one-shot multivibrator in which a variable time delay is achieved by varying the effective area of a photoconductive element exposed to radiation.

Still a further object is to provide an electro-optical one-shot multivibrator in which a variable time delay is achieved by varying the intensity of radiation applied to a photoconductive element.

Other objects will become apparent from the following description and claims, and the accompanying drawings, which disclose, by way of example, certain preferred embodiments of the invention.

In the drawings:

FIG. 1 is a sectional view of a typical electro-optical component utilizing electroluminescent and photoconductive elements.

FIG. 2 is a detail view showing one type of photoconductive element in which photoconductive material is sandwiched between two electrodes in a labyrinthine path.

FIGS. 3, 4, and 5 are perspective diagrammatic views showing various optically-coupled combinations of electroluminescent and photoconductive elements.

FIG. 6 is a plan view, partly broken away, of an electro-optical unit employing a shiftable mask between the photoconductive and electroluminescent elements, in order to enable the degree of optical coupling between the two elements to be varied.

FIG. 7 is an elevational view, partly broken away, of the unit of FIG. 6.

Figure 8:
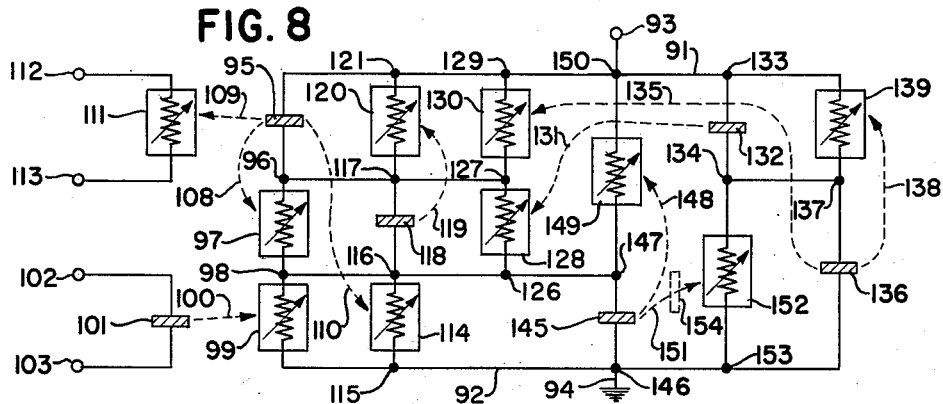

FIG. 8 is a schematic circuit diagram of one form of electro-optical one-shot multivibrator.

Figure 9:
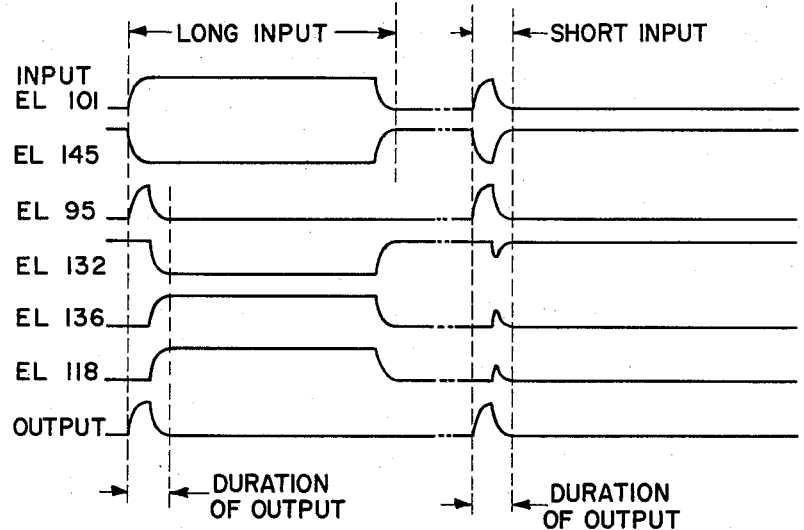

FIG. 9 shows a plurality of wave forms associated with various elements of the circuit shown in the diagram of FIG. 8.

FIG. 10 is a schematic circuit diagram of a second form of electro-optical one-shot multivibrator, having a variable time delay.

FIG. 11 shows a plurality of wave forms associated with various elements of the circuit shown in FIG. 10, as said device functions when adjusted to provide a relatively short time delay.

FIG. 12 shows a plurality of wave forms associated with various elements of the circuit shown in FIG. 10, as said device functions when adjusted to provide a relatively long time delay.

Figure 13:
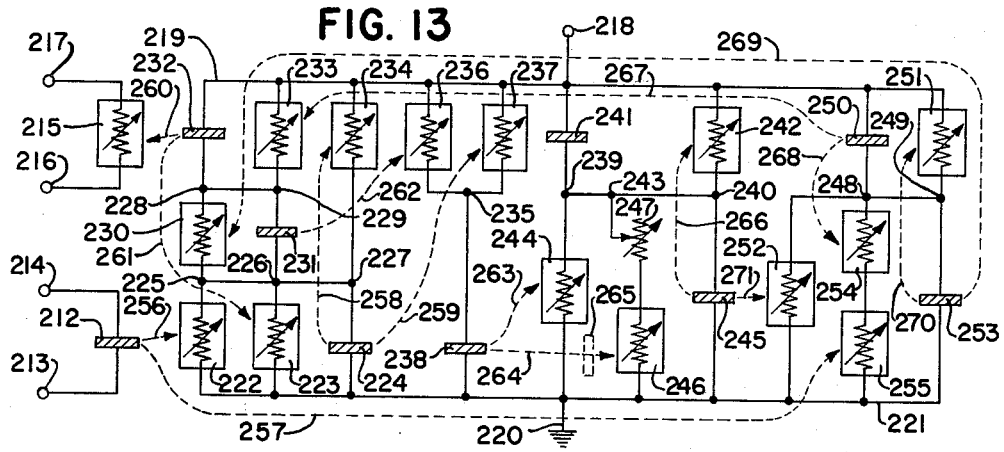

FIG. 13 is a schematic circuit diagram of a third form of electro-optical one-shot multivibrator, having a variable time delay.

Figure 14:
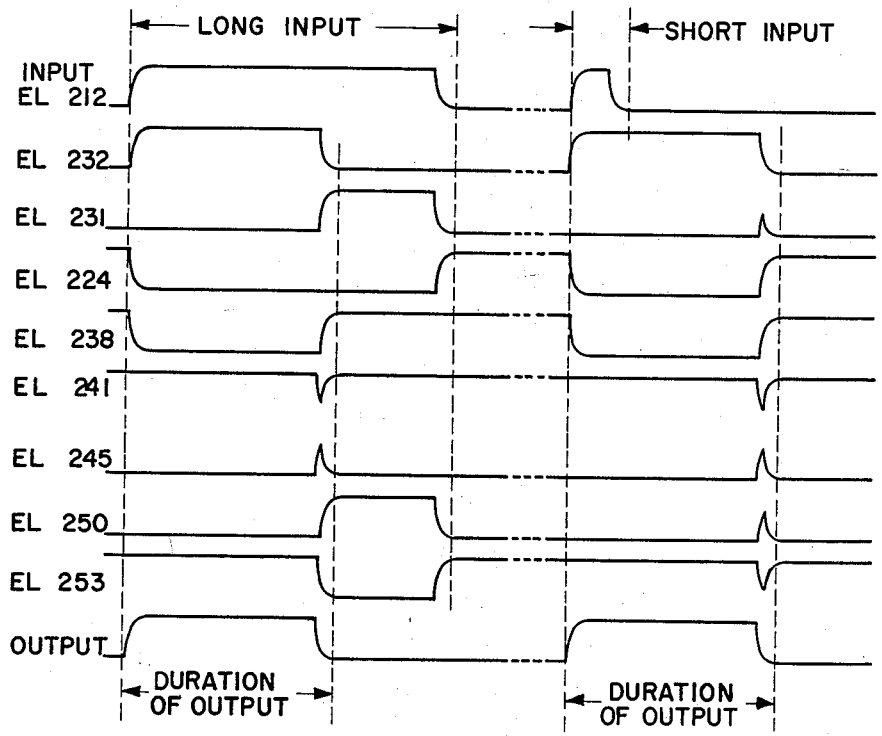

FIG. 14 shows a plurality of wave forms associated with various elements of the circuit shown in the diagram of FIG. 13.

Figure 15:
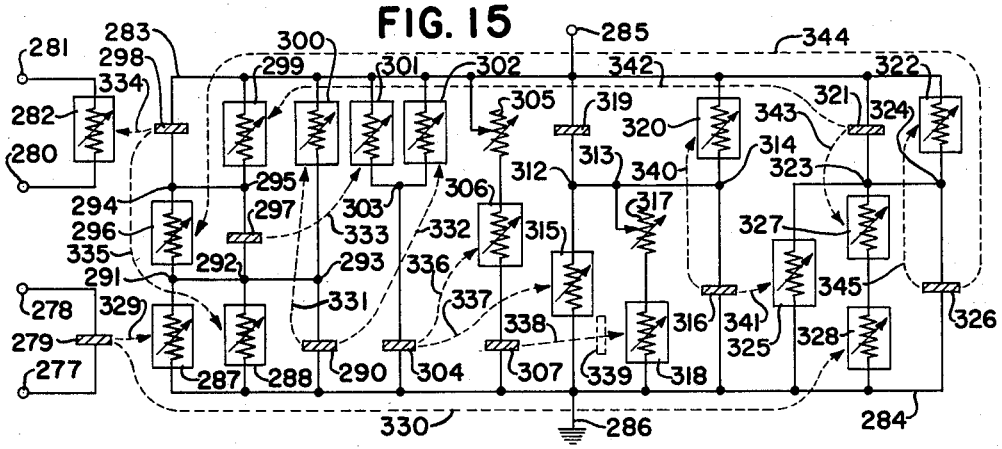

FIG. 15 is a schematic circuit diagram of a fourth form of electro-optical one-shot multivibrator, having a variable time delay.

Figure 16:
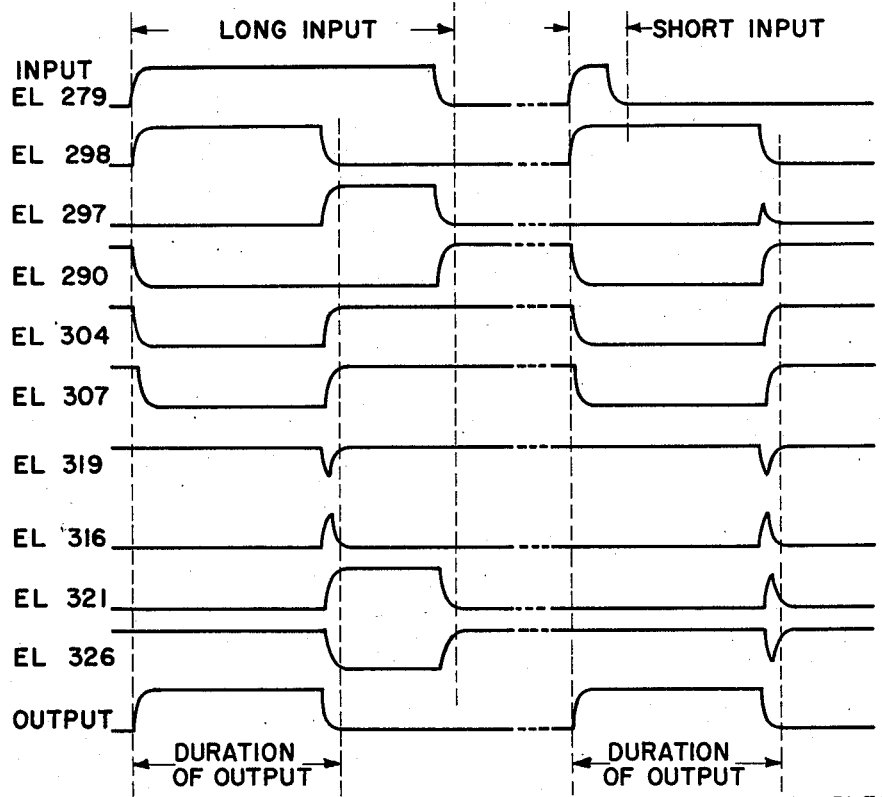

FIG. 16 shows a plurality of wave forms associated with various elements of the circuit shown in the diagram of FIG. 15.

Referring now to the drawings, shown in FIGS. 1 to 7 inclusive are a number of physical structures which may be used to implement the various embodiments of electro-optical one-shot multivibrators shown in FIGS. 8, 10, 13, and 15. While the physical structure of a complete electro-optical one-shot multivibrator is not shown for any of the embodiments of FIGS. 8, 10, 13, or 15, it is believed obvious to one skilled in the art to construct such a device, given the individual physical structures such as those shown in FIGS. 1 to 7 inclusive.

In FIG. 1, one form of electro-optical unit is shown in section, in order to illustrate most clearly the various components used. Deposited on a substrate 21 of glass or other suitable material is a very thin conductive layer 22 of such material as tin oxide, forming a transparent conductive element. Over the conductive layer 22 is applied an electroluminescent layer 23 of some suitable electroluminescent material, such as a zinc sulphide copper halide-activated type of phosphor in powdered form, in a transparent or translucent dielectric binder. A second conductive layer 24 is applied over the electroluminescent layer 23, and may be of tin oxide or similar material, like the layer 22, so that the layers 22 and 24 in effect act as the plates of a capacitive element in which the electroluminescent layer 23 is the dielectric.

As shown in FIG. 1, a transparent element 25 is positioned over the substrate 21 on which the layers 22, 23, and 24 have been applied. The element 25 may be formed of glass or other suitable material and acts as an insulator, to electrically isolate the electroluminescent structure on one side of the element 25 from a photoconductive structure on the other side thereof.

The photoconductive structure referred to above is applied to a substrate 26 of aluminum oxide or other suitable material, and includes a layer 27 of cadmium selenide or other suitable semi-conductor material to form a photoconductor, and a pair of metal electrodes 28 and 29, consisting of a thin metal coating directly applied to the photoconductive layer 27.

Operation of the electro-optical unit shown in FIG. 1 is as follows. In accordance with the well-known properties of electroluminescent materials, when a sufficient potential difference is applied to the conductive layers 22 and 24 across the electroluminescent layer 23, the layer 23 is caused to luminesce and thus emit radiation, which is transmitted through the transparent conductive layer 24 and the insulating element 25, to fall upon the photoconductive layer 27. By reference to FIG. 1, it may be seen that the photoconductive layer 27 in effect forms a connecting element between the two electrodes 28 and 29. However, when the photoconductive layer 27 is not illuminated and is in its dark state, its physical characteristics are such that it possesses an extremely high resistance to the passage of electrical current, and acts much the same as would an open switch in this position. When radiation impinges on that area of the photoconductive layer 27 which lies between the electrodes 28 and 29, however, the resistance of the illuminated portion of said layer, due to the well-known characteristics of photoconductive elements, is greatly reduced, so that the layer 27 acts as a conductor between the electrodes 28 and 29. It will therefore be obvious that when the electrodes 28 and 29 are connected in an electrical circuit, the layer 27 positioned between said two electrodes can be caused to function as a switch, and thus control the circuit, by the selective application of radiation of the correct wave lengths thereto. The electroluminescent layer 23 is produced from materials chosen to emit radiation, under potential difference applied thereacross, which radiation is of a type to alter the resistance characteristics of the photoconductive layer 27. It will accordingly be seen that a circuit containing the electrodes 28 and 29 can be controlled by the selective application of potential to the conductive layers 22 and 24, even though the electrodes 28 and 29, and the associated photoconductive layer 27, are electrically isolated from the conductive layers 22 and 24 and the electroluminescent layer 23 sandwiched therebetween.

In order for photoconductive material between two electrodes to serve as a connection between said electrodes, said material must be fully illuminated, because if any portion of the photoconductive inter-electrode path is unilluminated, or "dark," across its entire extent, then that portion acts as an open circuit and prevents conduction between the electrodes. For this reason a short photoconductive path between electrodes is generally desirable. At the same time, it is also desirable in certain applications to have a relatively large total effective photoconductive area between electrodes, in order to decrease the total resistance of the photoconductive inter-electrode path, and to permit said resistance to be varied, if desired, by illuminating only a portion of the effective photoconductive area. A novel configuration which provides a large photoconductive area between electrodes, but which also minimizes the likelihood of undesired "open circuit" conditions in an imperfectly illuminated photoconductive element between electrodes, is shown in FIG. 2. On a substrate 35 are located two electrodes 36 and 37, of comb-like configuration, with the "teeth" of each electrode extending into the space between the teeth of the other electrode. The area between adjacent teeth of the two electrodes is occupied by photoconductive material 38, which may be applied in a planar coating on the substrate 35 and beneath the electrodes 36 and 37, if said electrodes are applied over the photoconductive layer rather than directly onto the substrate. Alternatively, the photoconductive material 38 may be applied between the two electrodes 36 and 37 in a serpentine configuration, if said electrodes are applied directly to the substrate 35. It will be seen that by means of this configuration, a photoconductive element has been provided which has a relatively large photoconductive area and at the same time minimizes the likelihood of undesired "open circuit" conditions by utilizing a large number of short-distance paths between electrodes.

FIGS. 3, 4, and 5 have been included to illustrate diagrammatically the manner in which one or more photoconductive elements may be optically coupled to an electroluminescent element to achieve the various circuit configurations required by electro-optical circuitry of the type shown in FIGS. 8, 10, 13 and 15.

In FIG. 3, an electroluminescent element 40 includes electroluminescent material 41 in the form of a block on which are applied electrodes 42 and 43, which are connected to terminals 44 and 45, respectively. Optically coupled to the electroluminescent element 40 is a photoconductive element 46, which includes, on a substrate, two electrodes 47 and 48, between which is positioned photoconductive material 49. The elements 40 and 46 are cemented together by an adhesive layer therebetween, which also serves as an electrical insulator. The electrodes 47 and 48 are connected to terminals 50 and 51. Due to the optical coupling between the electroluminescent element 40 and the photoconductive element 46, the element 46 acts as a switch controlled by the element 41. Thus when no potential difference exists across the terminals 44 and 45 of the element 40, the photoconductive material 49 of the element 46 is not illuminated, and the element 46 has a high effective resistance, which causes it to act as an open switch. On the other hand, when a potential difference of sufficient magnitude is applied across the terminals 44 and 45 of the electroluminescent element, the electroluminescent material therein is energized, thus illuminating the photoconductive material 49 of the photoconductive element 46, and decreasing the resistance of the material 49, so that the element 46 acts substantially in the manner of a closed switch. The circuit which includes the element 46 is thus controlled by the circuit which includes the element 40, although the two circuits are electrically isolated from each other.

Shown in FIG. 4 is a structure similar to that of FIG. 3, except that in FIG. 4, two photoconductive elements 55 and 56 are optically coupled to a single electroluminescent element 57. Accordingly, two different circuits, each including one of the elements 55 or 56, can be controlled by the single circuit including the electroluminescent element 57. This control is exerted through optical coupling, and the various circuits containing the elements 55, 56, and 57 are all electrically isolated from each other.

The structure of FIG. 5 includes three photoconductive elements 58, 59, and 60, and two electroluminescent elements 61 and 62, which are provided on a single block 63. Three electrodes 64, 65, and 66 are applied to the block 63, and are connected to terminals 67, 68, and 69, respectively. This enables the single block 63 of electroluminescent material to perform as two different electroluminescent elements 61 and 62, and thus to serve two different circuit functions, since the electroluminescent material between the electrodes 64 and 65, constituting the element 61, can be energized by application of the proper potential difference across the terminals 67 and 68, without energizing that portion, forming electroluminescent element 62, of the block 63 which is between the electrodes 65 and 66. This illuminates the photoconductive elements 58 and 59, while allowing the photoconductive element 60 to remain dark. Similarly, the electroluminescent element 62, comprising the electroluminescent material of the block 63 between the electrodes 65 and 66, can be energized by application of the proper potential difference across the terminals 68 and 69, without energizing that portion of the block 63 which is between the electrodes 64 and 65, comprising the electroluminescent element 61. This illuminates the photoconductive element 60, while allowing the elements 58 and 59 to remain dark. A compact and efficient structure has thus been provided, which embodies a number of optically-coupled but electrically-isolated circuits.

An electro-optical unit having means for changing the effective illuminated area of the photoconductive element is shown in FIGS. 6 and 7. This unit is mounted on a support 74, to which are fixed guide members 75 and 76 by screws 77 or other suitable fastening means. An electroluminescent element 78, including the required electroluminescent material and electrodes, is positioned on the support 74 between the guide members 75 and 76, which are provided with recesses 79 and 80 to accommodate the element 78 and to maintain it in the desired position. Located above the element 78, and mounted for sliding movement between the guide members 75 and 76, is a mask 81, having an opaque portion 82 and a transparent portion 83. The mask 81 can be shifted back and forth over the electroluminescent element 78 between the guide members 75 and 76, so that all or any part of the electroluminescent element 78 can be selectively covered by the opaque portion 82 or exposed by the transparent portion 83.

Positioned above the mask 81, and in general alignment with the electroluminescent element 78, is a photoconductive element 84, which is preferably, though not necessarily, of the general configuration shown in FIG. 2. The photoconductive element 84 is retained in a recess in a cap member 85, which is secured by screws 86 or other suitable fastening means to the guide members 75 and 76.

It will be seen that the mask 81 in the electro-optical unit of FIG. 6, interposed between the electroluminescent element 78 and the photoconductive element 84, may be used to control the area of the photoconductive element 84 which is illuminated when the electroluminescent element 78 is energized, by shifting of the mask so that a greater or a lesser portion of the electroluminescent element 78 is exposed, by the transparent portion 83 of the mask 81, to the photoconductive element 84. Means have thus been provided for selectively varying the resistance of the element 84 by mechanical means. One way in which a photoconductive element having variable resistance can be employed will be described in the subsequent explanations of the circuits of FIGS. 8, 10, 13, and 15.

One embodiment of an electro-optical multivibrator constructed in accordance with the present invention is shown in FIG. 8. In this device, an output signal of predetermined duration, in the form of an emission of radiation from an energized electroluminescent element, is produced in response to an input signal, which may be of varying duration. In the following description of this and other embodiments of electro-optical multivibrators, it should be understood that where reference is made to an electroluminescent element, this is intended to cover other suitable types of radiation-emissive elements, such as neon tubes, and the invention is not intended to be limited merely to electroluminescent elements as such. Similarly, where reference is made to a photoconductive element, this is intended to cover any suitable type of element, the impedance of which is altered by exposure of the element to radiation of a suitable wave length; and in addition is intended to cover any suitable type of element in which a voltage is generated by exposure of the element to radiation of a suitable wave length, such as a photovoltaic cell, or "solar" cell.

In FIG. 8, a number of groups of optically-coupled photoconductive elements and electroluminescent elements are electrically connected between first and second common conductors 91 and 92, which in turn are connected to a source of A.C. power, here represented by a terminal 93, to which the first conductor 91 is connected, and a connection 94 to a base reference potential, shown here as ground, of the second conductor 92. It should be noted that the various electroluminescent elements and photoconductive elements are physically arranged with respect to each other so as to provide optical coupling between elements according to the various dashed, arrowheaded lines appearing in FIG. 8.

Connected between the conductors 91 and 92 at the left end thereof, as viewed in FIG. 8, is a serial combination of an electroluminescent element 95, a point 96, a first photoconductive element 97, a point 98, and a second photoconductive element 99. The photoconductive element 99 is optically coupled over a path 100 to an electroluminescent element 101, connected between terminals 102 and 103, to which may be applied an input signal for the circuit of FIG. 8, as will be more fully described subsequently.

The electroluminescent element 95 is optically coupled over paths 108, 109, and 110, respectively, to the photoconductive element 97, to an output photoconductive element 111 connected between two terminals 112 and 113, from which an output signal may be taken, as will subsequently be described, and to a photoconductive element 114. The photoconductive element 114 is connected between a point 115 on the common conductor 92 and another point 116 directly connected to the point 98. Connected between the point 116 and another point 117 common with the point 96 is an electroluminescent element 118, which is optically coupled over a path 119 to a photoconductive element 120, connected between the point 117 and a point 121 on the conductor 91.

Between a point 126 common with the points 98 and 116 and a point 127 common with the points 96 and 117 is connected a photoconductive element 128, and between the point 127 and a point 129 on the conductor 91 is connected a photoconductive element 130. The photoconductive element 128 is optically coupled over a path 131 to an electroluminescent element 132 connected between a point 133 on the conductor 91 and a point 134, while the photoconductive element 130 is optically coupled over a path 135 to an electroluminescent element 136 connected between the conductor 92 and a point 137 common with the point 134. The electroluminescent element 136 is also optically coupled over a path 138 to a photoconductive element 139 connected between the point 137 and the conductor 91.

An electroluminescent element 145 is connected between a point 146 on the conductor 92 and a point 147 common with the points 98, 116, and 126. Said element 145 is optically coupled over a path 148 to a photoconductvie element 149 connected between the point 147 and a point 150 on the conductor 91, and is also optically coupled over a path 151 to a photoconductive element 152 connected between the point 134 and a point 153 on the conductor 92. If desired, a shiftable mask 154 may be interposed in the optical path 151 between the electroluminescent element 145 and the photoconductive element 152, and may be used to vary the amount of radiation impinging on the photoconductive element 152, for a purpose which will be disclosed subsequently.

The mode of operation of the electro-optical multivibrator of FIG. 8 will now be explained with reference to the various wave forms shown in FIG. 9. In these wave forms, it will be noted that the wave forms pertaining to the various electroluminescent elements are designated on the left of FIG. 8 by the letters EL and the reference character of the particular element. The wave forms representing the condition of the various electroluminescent elements are shown at one of two levels, or in transition between the two levels. The upper level represents an energized condition, while the lower level represents a deenergized condition. The bottom wave form of FIG. 8 represents the condition of the output photoconductive element 111, and shows the inverse of the resistance of the output element, so that it is directly related to the amplitude of the output signal produced by the circuit of FIG. 8.

It may be noted that in the normal condition of the circuit of FIG. 8, before an input signal is applied to said circuit, the electroluminescent elements 132 and 145 are in an "on" condition, while the remaining electroluminescent elements 95, 101, 118, and 136 are extinguished, or in an "off" condition.

When an input signal is received on the terminals 102, 103, the electroluminescent input element 101 is energized, as shown in FIG. 9, and stays on for at least a certain minimum duration of time. In the first case shown, comprising the wave forms on the left side of FIG. 9, it stays on for a period of time considerably in excess of the predetermined desired duration of the output signal. The element 101 illuminates the photoconductive element 99 over the path 100, thus causing the resistance of the element 99 to decrease by a large amount. This reduces the potential difference between the point 146 on the conductor 92 and the point 147, which is common with the point 98, and causes the electroluminescent element 145 to be extinguished. The photoconductive element 149, which has been illuminated by the element 145 over the path 148, then increases in resistance, so that the voltage applied to the circuit consisting of the elements 95, 97, 118, 120, 123, and 130 is greatly increased.

Since the photoconductive element 123 in the circuit is illuminated over the path 131 by the electroluminescent element 132, which is normally in an "on" condition, the resistance of the element 123 is very low. This causes a large percentage of the voltage drop between the conductor 91 and the point 126 to appear across the electroluminescent element 95, and said element is thereby energized, as shown in FIG. 9. This illuminates the output photoconductive element 111 over the path 109, so that an output signal can appear across the terminals 112 and 113.

In addition to illuminating the photoconductive element 149, as described above, the electroluminescent element 145 also illuminates the photoconductive element 152 over the path 151. As described above, a mask 154 may be interposed in the path 151, and used to vary the amount of illumination transmitted from the element 145 to the photoconductive element 152. Since the resistance of a photoconductive element in its illuminated state is dependent upon the amount of radiation falling upon it, it will be seen that the greater the radiation falling upon a photoconductive element, the lower its "illuminated" resistance will be. As a consequence, when illumination of a photoconductive element which has been highly illuminated is terminated, it will take longer for that element to return to its high-resistance "dark" state than if it had been only slightly illuminated, so that its resistance in the illuminated state was higher, and closer in magnitude to its "dark" resistance. The time of response of the element 152 in changing from a relatively low resistance state to a relatively high resistance state can thus be varied by changing the setting of the mask 154. This, in turn, affects the temporal parameters of the circuit, and determines the duration of the output signal appearing across the terminals 112 and 113.

As the electroluminescent element 145 is extinguished, as described above, the resistance of the photoconductive element 152 increases, a total amount which is related to the degree to which it is illuminated over the path 151 and through the mask 154, lowering the voltage across the electroluminescent element 132 and causing it to become extinguished, and increasing the voltage across the electroluminescent element 136, and causing it to go "on."

Extinguishing of the element 132 terminates the illumination over the path 131 of the photoconductive element 123. The energization of the electroluminescent element 136 causes the photoconductive element 139 to be illuminated over the path 138, and also causes the photoconductive element 130 to be illuminated over the path 135. The increase in resistance of the element 123, and the decrease in resistance of the element 130, have the effect of extinguishing the electroluminescent element 95, while the electroluminescent element 118 is energized. Also, the illumination of the photoconductive element 139, and its consequent lowering of resistance, in effect provide a holding circuit to maintain the electroluminescent element 136 in an energized condition.

The extinguishing of the electroluminescent element 95 causes an increase in resistance of the photoconductive element 111, to which it is coupled over the path 109, thus effectively terminating the output signal which is taken from the terminals 112 and 113, as shown in the bottom wave form of FIG. 9. The duration of the output signal is thus determined by the response speed of the photoconductive element 152 and the amount of illumination that was allowed to reach it over the path 151, through the mask 154. Extinguishing of the electroluminescent element 95 also terminates the illumination of the photoconductive element 114 over the path 110.

The circuit of FIG. 8 will now remain in the state described above, until the input pulse appearing on the terminals 102 and 103 is terminated, at which time the circuit will restore itself to its original condition. It will be seen that the termination of the input pulse on the terminals 102 and 103 causes the electroluminescent element 101 to be extinguished, thus terminating illumination over the path 100 of the photoconductive element 99. Since both the photoconductive elements 99 and 114 are in a dark, or high-resistance, state, the electroluminescent element 145 is caused to be energized, as shown in the diagram of FIG. 9, at the termination of the input pulse, thus illuminating the photoconductive elements 149 and 152 over the paths 148 and 151, respectively. Illumination of the photoconductive element 149, causing it to shift to a low-resistance state, provides a holding circuit for the electroluminescent element 145, and also, by decreasing the potential difference across the electroluminescent element 118, causes the element 118 to be extinguished. The illumination of the photoconductive element 152, and its consequent shift to a low-resistance state, cause the electroluminescent element 132 to be energized, while the electroluminescent element 136 is extinguished. All of the components of the circuit of FIG. 8 are thus returned to their initial state in readiness for the next input pulse on the terminals 102 and 103.

The wave forms resulting from a case in which the input pulse is of relatively short duration are shown on the right side of FIG. 9. If the input pulse is of sufficient duration to cause the electroluminescent element 145 to be completely extinguished, the circuit of FIG. 8 will carry through the complete cycle of operation even if the input pulse is then terminated. Another input pulse may be applied to the circuit as soon as it has returned to its original state.

In FIG. 10 is shown another embodiment of an electro-optical multivibrator constructed in accordance with the present invention. This embodiment differs from the embodiment of FIG. 8 in that a series combination of a variable resistor and a photoconductive element having special response characteristics is placed in parallel with one of the other photoconductive elements of the circuit. The use of this series combination of a variable resistor and a photoconductive element enables the duration of the output signal of the multivibrator to be adjusted in accordance with differing requirements for the circuit.

The wave forms in FIGS. 11 and 12 illustrate the conditions of various components of the circuitry in cases where the circuit is set to produce a relatively short duration of the output signal, as in FIG. 11, and in cases where the circuit is set to produce a relatively long duration of the output signal, as in FIG. 12. The wave forms pertaining to the condition of the various circuit components are designated in the same manner as in FIG. 9.

Input means for the circuit of FIG. 10 is the same as that employed in FIG. 8 and comprises an electroluminescent element 160 connected between terminals 161 and 162, to which an input signal may be applied. Similarly, the output means is the same as that employed in FIG. 8 and comprises a photoconductive element 163 connected between two terminals 164 and 165, from which an output signal may be taken.

Included in the circuit of FIG. 9 are first and second common conductors 166 and 167. Provision for application of A.C. power to the circuit consists of a terminal 168, connected to the conductor 166, and a second connection 169 to a base reference potential, shown in FIG. 10 as connected to ground, which is associated with the conductor 167.

An electroluminescent element 170 and two photoconductive elements 171 and 172 are connected in parallel between the conductor 166 and a plurality of common points 173, 174, and 175, respectively. Between the points 173, 174, and 175 and a second plurality of points 176, 177, and 178, respectively, are connected, in parallel, a photoconductive element 179, an electroluminescent element 180, and a photoconductive element 181.

Between the points 176 and 177, respectively, and the conductor 167 are connected in parallel two photoconductive elements 182 and 183. An electroluminescent element 184 is connected in parallel with the elements 182 and 183, between the conductor 167 and a point 185, which is common with the points 176, 177, and 178. Between the point 185 and the conductor 166 is connected a photoconductive element 186.

Between the conductor and the common points 187 and 188 are connected in parallel an electroluminescent element 189 and a photoconductive element 190. Between the common points 187 and 188, and a third point 191 common with the points 187 and 188, and the conductor 167 are connected in parallel a photoconductive element 192, an electroluminescent element 193, and a serial combination of a photoconductive element 194 and a variable resistor 195.

The various elements of the circuit of FIG. 10 are physically arranged so as to be optically coupled along the arrow-headed paths indicated in dashed lines in FIG. 10. These paths are generally similar to the coupling paths employed for corresponding elements in the circuit of FIG. 8. The electroluminescent element 160 is coupled by the path 207 to the photoconductive element 182. The electroluminescent element 170 is coupled by paths 196, 197, and 198 to photoconductive elements 163, 179, and 183, respectively. The electroluminescent element 180 is coupled by the optical path 199 to the photoconductive element 171. The electroluminescent element 184 is coupled by paths 200, 201, and 202 to the photoconductive elements 186, 192, and 194, respectively. If desired, a mask 203 may be interposed in the optical path 202 between the electroluminescent element 184 and the photoconductvie element 194 to serve a function similar to that served by the mask 154 in FIG. 8.

The electroluminescent element 189 is connected by an optical path 204 to the photoconductive element 181, and the electroluminescent element 193 is connected by optical paths 205 and 206 to photoconductive elements 172 and 190, respectively.

As was previously stated, the photoconductive element 194 has special response characteristics which differ from those of the photoconductive element 192. Preferably, the element 194 is fabricated from photoconductive material, such as cadmium sulphide, having a relatively slow response time; that is, a material which takes a relatively long time to change its electrical resistance from high resistance to low resistance when illuminated by radiation of the proper wave length. The photoconductive element, on the other hand, is preferably fabricated from a photoconductive material, such as cadmium selenide, having a relatively fast response time; that is, a material which takes a relatively short time to change its electrical resistance from a high resistance to a low resistance when illuminated by radiation of the proper wave length. The variable resistor 195 determines the degree to which the "slow" photoconductive element 194 shunts the "fast" photoconductive element 192, and the two photoconductive elements together determine the rate at which the voltage at the common points 187, 188, and 191 changes. This, in turn, determines the times at which the electroluminescent elements 189 and 193 are energized and extinguished.

The mode of operation of the electro-optical multivibrator of FIG. 10 is basically similar to the operation of the embodiment of FIG. 8. In the normal condition of the device of FIG. 10, before an input signal is applied thereto, the electroluminescent elements 184 and 189 are in energized, or "on," condition, while the remaining electroluminescent elements 160, 170, 180, and 193 are in an extinguished, or "off," condition.

Let it be assumed that the variable resistor 195 is so adjusted that a relatively high resistance is in series with the photoconductive element 194. This is effective to produce a relatively short-duration output signal, as shown in the wave forms of FIG. 11. As previously mentioned, the duration of the output signal may be further varied by use of the mask 203 to vary the amount of radiation transmitted over the path 202 from the electroluminescent element 184 to the photoconductive element 194. Of course, it will be realized that as the resistance of the resistor 195 is increased, the setting of the mask 203 will have less effectiveness in varying the duration of the output signal, since the photoconductive element 194 will have less influence on the temporal parameter of the circuit.

When an input signal is received on the terminals 161 and 162, the electroluminescent input element 160 is energized, as shown in FIG. 11, and remains energized for at least a certain minimum length of time. In the first case shown, comprising the wave forms at the left side of FIG. 11, the element 160 stays on for a period of time considerably in excess of the predetermined duration of the output signal. The element 160 illuminates the photoconductive element 182 over the path 207, thus causing the resistance of the element 182 to decrease by a large amount. This reduces the potential difference between the conductor 167 and the point 185, which it common with the point 176, and causes the electroluminescent element 184 to be extinguished. The photoconductive element 186, which has been illuminated by the element 184 over the path 200, then increases in resistance, so that the voltage applied to the circuit consisting of the elements 170, 171, 172, 179, 180, and 181 is greatly increased. Since the electroluminescent element 189 has been illuminating the photoconductive element 181 over the path 204, the increase in potential mentioned above causes the electroluminescent element 170 to immediately become energized. This element then establishes a holding circuit for itself by illumination of the photoconductive element 179 over the path 197. The element 170 also causes the output photoconductive element 163 to become illuminated over the path 196, thus initiating the output signal.

When the electroluminescent element 184 is extinguished by the input signal, as previously described, the resistance of the combination of elements 192 and 194 increases at the rate determined by the setting of the mask 203 and the variable resistor 195, thus lowering the voltage across the electroluminescent element 189 and causing it to be extinguished. As was described in connection with the circuit of FIG. 8, the mask 203 can be selectively positioned to determine the total illumination which falls upon the photoconductive element 194, and thus determine the total decrease in resistance of that element from its resistance in a "dark" state. This, in turn, determines the total time required for the element to return to its "dark" state resistance, once illumination has been terminated.

At the same time, the voltage across the electroluminescent element 193 is increasing, and this element is caused to become energized. Since the photoconductive element 181 is no longer illuminated over the path 204, due to the extinguishing of the element 189, it shifts to a high-resistance state, while the photoconductive element 172, which is now illuminated by the electroluminescent element 193 over the path 205, shifts to a low-resistance state. This change in conditions of the elements 172 and 181 causes the electroluminescent element 170 to become extinguished while the electroluminescent element 180 is energized. Extinguishing of the element 170 terminates the output signal on the terminals 164 and 165, by darkening the photoconductive cell 163. At the same time, the illumination of the photoconductive elements 179 and 183 by the element 170 over the paths 197 and 198 is terminated. The photoconductive element 171 is illuminated over the path 199 by the electroluminescent element 180 to establish a holding circuit for said element 180. The circuit will remain in the state described until the input pulse on the terminals 161 and 162 is terminated, which terminates the energization of the electroluminescent element 160 and thereby terminates the illumination of the photoconductive element 182 over the path 207. This then causes the electroluminescent element 184 to return to its normal "on" condition, and restores the circuit to its original condition to await the next input signal on the terminals 161 and 162.

As shown by the wave forms on the right side of FIG. 11, so long as the input signal is of sufficient duration to cause the electroluminescent element 184 to be completely extinguished, the circuit will go through its complete cycle of operation, and the duration of the output signal is not affected thereby. The next input signal may be applied as soon as the circuit returns to its original state.

The wave forms of FIG. 12 show the conditions of the various components of the circuit of FIG. 10 as said circuit goes through a cycle of operation, when the variable resistor 195 has been adjusted to provide a relatively low resistance in series with the photoconductive element 194. This produces an output signal of relatively long duration, as may be seen by the lowermost wave form of FIG. 12. The circuit functions in the same manner as described above in connection with the wave forms of FIG. 11, both in the case of a relatively long input signal and in the case of a relatively short input signal.

FIG. 13 shows a third embodiment of an electrooptical multivibrator constructed according to the present invention. This embodiment differs from the embodiment of FIG. 10 in that certain additional components have been added to provide an improved circuit having higher gain characteristics and capable of greater variation in the duration of the output signal than can be obtained with the circuit of FIG. 10.

Input means for the circuit of FIG. 13 is the same as that employed in FIGS. 8 and 10 and comprises an electroluminescent element 212 connected between terminals 213 and 214, to which an input signal may be applied. Similarly, the output means is the same as that employed in FIGS. 8 and 10 and comprises a photoconductive element 215 connected between two terminals 216 and 217, from which an output signal may be taken.

A source of A.C. power is applied to the circuit of FIG. 13 over a terminal 218 connected to a first conductor 219, and over a second connection 220 to a base reference potential, shown in FIG. 13 as connected to ground, said connection being associated with a second conductor 221.

Two photoconductive elements 222 and 223, and an electroluminescent element 224, are connected in parallel between the conductor 221 and a plurality of common points 225, 226, and 227, respectively. Between the points 225 and 226 and a second pair of common points 228 and 229 are connected in parallel a photoconductive element 230 and an electroluminescent element 231. Between the points 228, 229 and the conductor 219 are connected in parallel an electroluminescent element 232 and a photoconductive element 233. Between the conductor 219 and the point 227 is connected a photoconductive element 234. Connected in parallel between the conductor 219 and a point 235 are a pair of photoconductive elements 236 and 237, while between the point 235 and the conductor 221 is connected an electroluminescent element 238.

Connected in parallel between the conductor 219 and a pair of common points 239 and 240 are an electroluminescent element 241 and a photoconductive element 242. A third point 243 is also common to the points 239 and 240. Between the common points 239, 240, and 243 and the conductor 221 are connected in parallel a photoconductive element 244, an electroluminescent element 245, and a series combination of a photoconductive element 246 and a variable resistor 247. The element 244 is a relatively small photoconductive element in physical size, fabricated of a material, such as cadmium selenide, having relatively fast response time characteristics, while the element 246 is a relatively large element in physical size, fabricated of a material, such as cadmium sulphide, having relatively slow response time characteristics.

Connected in parallel between two common points 248 and 249 and the conductor 219 are an electroluminescent element 250 and a photoconductive element 251. Connected in parallel between the points 248, 249 and the conductor 221 are a photoconductive element 252, an electroluminescent element 253, and a series combination of two photoconductive elements 254 and 255.

The various components of the multivibrator of FIG. 13 are physically arranged to provide optical coupling paths in the particular arrangement described below. The electroluminescent element 212 is optically coupled to the photoconductive elements 222 and 255 over paths 256 and 257, respectively. The electroluminescent element 224 is optically coupled to the photoconductive elements 234 and 237 over paths 258 and 259, respectively. The electroluminescent element 232 is optically coupled to the photoconductive elements 215 and 223 over paths 260 and 261, respectively. The electroluminescent element 231 is optically coupled to the photoconductive element 236 over a path 262. The electroluminescent element 238 is optically coupled to the photoconductive elements 244 and 246 over optical paths 263 and 264, respectively. A mask 265, similar to the mask 203 of FIG. 10, may be interposed in the optical path 264 between the electroluminescent element 233 and the photoconductive element 246, if desired. This mask may be utilized to vary the amount of radiation which is transmitted from the electroluminescent element 238 to the photoconductive element 246, if desired, in order to vary the time required for the element 246 to return to its dark state resistance from that of an illuminated state, as previously described in connection with the circuits of FIGS. 8 and 10.

The electroluminescent element 241 is not optically coupled to any of the photoconductive elements of FIG. 13, and functions as a load, or impedance element. If desired, it could be replaced by a capacitor having the proper characteristics.

The electroluminescent element 245 is optically coupled to the photoconductive elements 242 and 252 over optical paths 266 and 271. The electroluminescent element 250 is optically coupled to the photoconductive elements 233 and 254 over paths 267 and 268, respectively. The electroluminescent element 253 is optically coupled to the photoconductive elements 230 and 251 over paths 269 and 270, respectively.

The mode of operation of the electro-optical multivibrator of FIG. 13 is similar to that of the multivibrator of FIG. 10. In the normal condition of the device of FIG. 13, before an input signal is applied thereto, the electroluminescent elements 224, 238, 241, and 253 are in an energized, or "on," condition, while the remaining electroluminescent elements 212, 231, 232, 245, and 250 are in an extinguished, or "off," condition.

As in the description of operation of the multivibrator of FIG. 10, it will be assumed that the variable resistor 247 of the multivibrator of FIG. 13 is so adjusted that a relatively high resistance is in series with the photoconductive element 246. This is effective to produce a relatively short-duration output signal, as shown in the wave forms of FIG. 14. As previously mentioned, the duration of the output signal may be further controlled by use of the mask 265 to vary the amount of radiation transmitted over the path 264 from the electroluminescent element 238 to the photoconductive element 246, and thus vary the time required for the photoconductive element 246 to return to its dark state resistance from that of an illuminated state.

The slightly greater complexity of the circuit of FIG. 13, as compared to the circuit of FIG. 10, enables a smaller degree of "fan-out" from the element 238 of FIG. 13 than from the corresponding element 184 of FIG. 10. That is, the element 238 of FIG. 13 is optically coupled to only two photoconductive elements, while the element 184 of FIG. 10 is optically coupled to three photoconductive elements. The difference here is that a larger amount of radiation can be directed to each of the two photoconductive elements of FIG. 13 optically coupled to the electroluminescent element 238 than the amount of radiation directed to each of the three photoconductive cells 186, 192, and 194 optically coupled to the electroluminescent element 184 of FIG. 10. This makes it possible to utilize the photoconductive element 246 of relatively large physical size, which gives it a lower resistance, in both dark and illuminated states, than a smaller element of the same material would have. Such a lower resistance makes possible a longer maximum duration of the output pulse produced by the circuit. For this reason, a greater variation in the duration of the output pulse may be obtained with the circuit of FIG. 13 than may be obtained with the circuit of FIG. 10. Also, since larger areas of photoconductive elements can be employed in the circuit of FIG. 13, the values in response time of the photoconductive elements employed in FIG. 13 are less critical than those employed in FIG. 10, and less expensive elements can be used.

The conditions of the various electroluminescent elements in the circuit of FIG. 13 during a cycle of operation are shown by the wave forms of FIG. 14, which are designated in the same manner as in FIG. 9. The bottom wave form of FIG. 14 represents the condition of the output photoconductive element 215 and shows the inverse of the resistance of the output element, so that it is directly related to the amplitude of the output signal produced by the circuit of FIG. 13.

When an input signal is received on the terminals 213, 214, the electroluminescent element 212 is energized, as shown in the uppermost wave form of FIG. 14, and stays on for at least a certain minimum duration of time, corresponding to the duration of the input signal applied to the circuit of FIG. 13. In the first case shown, comprising the wave forms at the left side of FIG. 14, the element 212 stays on for a period of time somewhat in excess of the predetermined desired duration of the output signal. The element 212 illuminates the photoconductive element 222 over the optical path 256, thus causing the resistance of the element 222 to decrease by a large amount. Similarly, the electroluminescent element 212 illuminates the photoconductive element 255 over the optical path 257 and causes the resistance of the element 255 to drop by a large amount. A decrease in resistance of the element 222 reduces the potential drop between the conductor 221 and the common points 225, 226, and 227 to a relatively low value, and causes the electroluminescent element 224 to be extinguished. At the same time, the electroluminescent element 232 is energized by the drop in resistance across the photoconductive element 222, due to the fact that the photoconductive element 230 is also illuminated by the electroluminescent element 253, which is in an energized condition at the beginning of the cycle of operation of the multivibrator of FIG. 13.

Extinguishing of the electroluminescent element 224 terminates the illumination over the optical path 259 of the photoconductive element 237 and thereby causes the electroluminescent element 238 to be extinguished. As may be seen in FIG. 13, the electroluminescent element 238 controls the photoconductive element 244 over the optical path 263, and also controls the photoconductive element 246 over the optical path 264, in which may be interposed a mask 265 to vary the amount of radiation transmitted from the element 238 to the element 246. As previously mentioned, the element 244 has relatively fast response characteristics, while the element 246 has relatively slow response time characteristics. The effectiveness of the element 246 to influence the delay time may further be varied by operation of the mask 265, as previously described in connection with other embodiments of the invention. Accordingly, when the electroluminescent element 238 is extinguished, the photoconductive element 244 will rapidly shift from a low resistance state to a high resistance state, while the element 246 will also commence a shift from a low resistance state to a high resistance state, but will move in this direction more slowly, due to its slower response-time characteristics. The rate of potential change at the common points 239, 240, and 243 is thus controlled by the rate of change of resistance of the photoconductive element 246, the adjustment of the mask 265, and the setting of the variable resistor 247. If the variable resistor 247 is set to provide a very high resistance in series with the element 246, the slow rate of change of the element 246 will have relatively less effect than if only a small resistance is placed in series with said element by the setting of the variable resistor 247.

Here, it will be assumed that an appreciable length of time passes before the resistance of the element 246, taken in combination with the resistance of the variable resistor 247, increases sufficiently to cause the potential at the common points 239, 240, and 243 to be such that the electroluminescent element 245 is energized, while the electroluminescent element 241 is extinguished. This duration of time is represented by the distance from the rise of the input signal to the change of state of the elements 241 and 245, as shown in the wave forms of FIG. 14. As the electroluminescent element 245 is energized, it illuminates the photoconductive elements 242 and 252 over the optical paths 266 and 271. Illumination of the element 242 establishes a holding circuit for maintaining the element 245 in energized condition, while illumination of the element 252 causes its resistance characteristics to change so that the potential difference between the common points 248, 249 and the conductor 221 is reduced to a sufficient degree to cause the electroluminescent element 253 to be extinguished and to cause the electroluminescent element 250 to be energized. Once the extinguishing of the element 253 and the energization of the element 250 have commenced, each of these processes is accelerated by the feed-back action of the photoconductive elements which are associated with each of the electroluminescent elements. To be specific, the photoconductive element 254 is associated with the electroluminescent element 250 and is illuminated by it over the optical path 268. As the element 250 is initially energized, the element 254 therefore decreases in resistance and tends to hasten the energization of the element 250 to a maximum value. By the same token, the element 253, during its energization, illuminates the element 251 over the optical path 270. As the element 253 is extinguished, the illumination of the element 251 ceases, and that element commences to increase in resistance, thus hastening the extinguishing of the element 253 to a substantially unenergized condition.

Due to the switching in state of the element 250, the photoconductive element 233, which is optically coupled to the element 250 over the path 267, becomes illuminated, and its resistance drops. At the same time, the photoconductive element 230, which has been illuminated by the electroluminescent element 253 over the optical path 269, is darkened, due to the termination of illumination by the element 253, and its resistance increases. The effect of this is to cause the electroluminescent element 232 to become extinguished while the electroluminescent element 231 is energized.

Extinguishing of the element 232 terminates the output pulse over the terminals 216 and 217, since illumination of the photoconductive element 215 over the optical path 260 by the element 232 is terminated. At the same time, the energization of the element 231 causes the photoconductive element 236 to be illuminated over the path 262, and this in turn is effective to re-energize the electroluminescent element 238. The re-energization of the electroluminescent element 238 is effective to illuminate the photoconductive element 244 over the optical path 263. Since the element 244 has a rapid response, the potential at the common points 239, 240, and 243 rapidly shifts toward the potential of the conductor 221. This causes the extinguishing of the electroluminescent element 245 and the re-energization of the electroluminescent element 241. It will be noted from the wave forms of FIG. 14 applicable to these two elements that their change in state from their original condition is thus a very brief one, with the electroluminescent element 241 being temporarily de-energized but rapidly resuming its energized state, while the element 245 is momentarily energized but then is rapidly de-energized.

The various components of the circuit of FIG. 13 now maintain the present condition in which they are until the input pulse on the terminals 213, 214 is terminated and the electroluminescent element 212 is de-energized. De-energization of the element 212 causes illumination of the photoconductive elements 222 and 255 to be terminated. As the resistance of the element 222 increases, the electroluminescent element 224 re-energizes, and this process is accelerated by the illumination of the photoconductive element 234 over the path 258 by the element 224. Therefore, as the electroluminescent element 224 is energized, the electroluminescent element 231 is de-energized. The energization of the electroluminescent element 238 is maintained by the illumination of the photoconductive element 237 over the path 259 by the element 224, even though the photoconductive element 236 is darkened as the element 231 is de-energized.

Darkening of the photoconductive element 255 causes the electroluminescent element 250 to be de-energized, as the electroluminescent element 253 becomes re-energized. The respective switching in states of the two elements 250 and 253 is accelerated, in the manner previously described, by the feed-back action resulting from the optical coupling between these elements and their corresponding photoconductive elements 254 and 251.

The re-energization of the electroluminescent element 253 causes illumination of the photoconductive element 230 over the path 269, while the extinguishing of the element 250 causes the photoconductive element 233 to darken.

The family of wave forms shown at the right side of FIG. 14 shows the conditions of the various electroluminescent elements during a cycle of operation of the multivibrator of FIG. 13, in which a relatively short input signal is applied to the terminals 213, 214. The sequence of operation is generally similar to that described in connection with the long input signal, the wave forms for which are shown on the left side of FIG. 14. It will be noted that in each case the duration of the output signal appearing across the terminals 216, 217 is the same. As has been previously described, the duration of the output signal can be selectively altered in the multivibrator of FIG. 13 either by adjusting the setting of the variable resistor 247, or by adjusting the mask 265 to vary the amount of radiation transmitted therethrough from the element 238 to the element 246, or by a combination of both.

A fourth embodiment of an electro-optical multivibrator constructed according to the present invention is shown in FIG. 15. This embodiment differs from the embodiment of FIG. 13 in that an additional serial arrangement of a variable resistor, a photoconductive element, and an electroluminescent element has been added to the circuitry in order to provide a further factor of gain to the multivibrator to enable a wider variation in duration of output pulse time to be achieved, and also to provide a greater element of control over the degree of energization of a driving electroluminescent element than is possible in the circuit of FIG. 13.

The input means for the circuit of FIG. 15 is similar to that employed in the circuits of FIGS. 8, 10, and 13, and comprises an electroluminescent element 279 connected between terminals 277 and 278, to which an input signal may be applied. Similarly, the output means of the circuit of FIG. 15 is similar to that employed in the circuits of FIGS. 8, 10, and 13, and comprises a photoconductive element between two terminals 280 and 281, from which an output signal may be taken.

Included in the circuit of FIG. 15 are first and second common conductors 283 and 284. Provision for application of A.C. power to the circuit consists of a terminal 285 connected to the conductor 283 and a second connection 286 to a base reference potential, shown in FIG. 15 as connected to ground, which is associated with the conductor 284.

A photoconductive element 287, a second photoconductive element 288, and an electroluminescent element 290 are connected in parallel between the conductor 284 and a plurality of common points 291, 292, and 293, respectively. Between the points 291, 292 and a second plurality of points 294 and 295 are connected, in parallel, a photoconductive element 296 and an electroluminescent element 297. Between the points 294, 295 and the conductor 283 are connected, in parallel, an electroluminescent element 298 and a photoconductive element 299. Between the point 293 and the conductor 283 is connected a photoconductive element 300.

A pair of photoconductive elements 301 and 302 are connected in parallel between the conductor 283 and a point 303. Between the point 303 and the conductor 284 is connected an electroluminescent element 304.

Serially connected between the conductors 283 and 284 is a combination consisting of a variable resistor 305, a photoconductive element 306, and an electroluminescent element 307.

Connected in parallel between three common points 312, 313, and 314 and the conductor 284 are a photoconductive element 315, an electroluminescent element 316, and a serial combination of a variable resistor 317 and a photoconductive element 318. Connected in parallel between the common points 312, 314 and the conductor 283 are an electroluminescent element 319 and a photoconductive element 320.

An electroluminescent element 321 and a photoconductive element 322 are connected in parallel between the conductor 283 and a pair of common points 323 and 324. Between the points 323, 324 and the conductor 284 are connected, in parallel, a photoconductive element 325, an electroluminescent element 326, and a series combination of two photoconductive elements 327 and 328.

The various components of the multivibrator of the circuit of FIG. 15 are physically arranged to provide a number of optical coupling paths between electroluminescent elements and photoconductive elements in order to cause the device to function in the desired manner. These various optical coupling paths will now be described.

The electroluminescent element 279 is optically coupled to the photoconductive elements 287 and 328 over paths 329 and 330. The electroluminescent element 290 is optically coupled to photoconductive elements 300 and 302 over paths 331 and 332. The electroluminescent element 297 is optically coupled to the photoconductive element 301 over a path 333. The electroluminescent element 298 is optically coupled to the output photoconductive element 282 and to the photoconductive element 288 over paths 334 and 335, respectively.

Optical coupling means are provided between the electroluminescent element 304 and the photoconductive elements 306 and 315 over paths 336 and 337. The electroluminescent element 307 is optically coupled to the photoconductive element 318 over a path 338, in which path may be interposed a mask 339, by which means the amount of radiation transmitted from the element 307 to the element 318 may be varied.

The electroluminescent element 319 is not coupled to any photoconductive element, but serves as a load in the circuit. If desired, a capacitive element having the proper impedance characteristics could be substituted for the electroluminescent element 319.

Optical coupling means are provided between the electroluminescent element 316 and the photoconductive elements 320 and 325 over paths 340 and 341. The electroluminescent element 321 is optically coupled to the photoconductive elements 299 and 327 over paths 342 and 343, respectively. Optical coupling means are provided between the electroluminescent element 326 and the photoconductive elements 296 and 322 over paths 344 and 345.

The mode of operation of the electro-optical multivibrator of FIG. 15 is basically similar to that of the multivibrator of FIG. 13, except that an additional stage, consisting of a serially-connected electroluminescent element, photoconductive element, and variable resistor has been added, in order to provide a greater permissible variation in the duration of the output signal, and to improve the element of control of the electroluminescent driving means. The additional stage in the multivibrator of FIG. 15 eliminates the need for the electroluminescent driving means to provide illumination to more than one photoconductive element. This in turn increases the amount of illumination which is available for each photoconductive element, and thus permits the use of photoconductive elements of larger area, which in turn permits a response time of greater duration than is possible with the device of FIG. 13.

In the normal condition of the device of FIG. 15, before an input signal is applied thereto, the electroluminescent elements 290, 304, 307, 319, and 326 are in an energized, or "on," condition, while the remaining electroluminescent elements, 279, 297, 298, 316, and 321, are in an extinguished, or "off," condition.

The wave forms of FIG. 16 illustrate the condition of the various electroluminescent elements of the circuit of FIG. 15 as said circuit completes a cycle of operation, and are designated in the same manner as in FIG. 9. At the bottom of the series of wave forms of FIG. 16 is shown a wave form for representing the output signal taken from the terminals 280, 281 of FIG. 15. The wave form represents the inverse of the resistance of the photoconductive element 282 in this case. Also it may be noted that the series of wave forms at the left of FIG. 16 represent the conditions of the various elements as the device functions during a cycle of operation in which an input signal of relatively long duration has been employed. The group of wave forms at the right of FIG. 16 represent the conditions of the various elements when a relatively short input signal is employed.

In describing the operation of the circuit of FIG. 15, let it be assumed that the variable resistor 317 is so adjusted that a relatively low resistance is in series with the photoconductive element 318. This is effective to produce a relatively long-duration output signal, as shown in the wave forms of FIG. 16. As previously mentioned, the duration of the output signal may be further varied by use of the mask 339 to vary the amount of radiation transmitted over the path 338 from the electroluminescent element 307 to the photoconductive element 318. In the embodiment of FIG. 15, the duration of the output signal may be varied by a further means; that is, adjustment of the variable resistor 305 to vary the amount of radiation which the electroluminescent element 307 is capable of emitting. With a relatively large amount of resistance included in the circuit with the element 307, by appropriate adjustment of the variable resistor 305, a relatively low level of radiation will be emitted by the electroluminescent element 307. On the other hand, when a relatively small amount of resistance is included in the circuit, by appropriate adjustment of the variable resistor 305, a relatively large amount of radiation will be emitted by the electroluminescent element 307 when energized.

When an input signal is received on the terminals 277, 278, the electroluminescent input element 279 is energized, as shown in FIG. 16, and stays on for at least a certain minimum duration of time, represented in FIG. 16 by the period denoted "long input" on the left, and "short input" on the right. In the first case shown, comprising the wave forms of the left side of FIG. 16, the electroluminescent element 279 stays on, in response to a continuing signal on the terminals 277, 278, for a period of time considerably in excess of the predetermined desired duration of the output signal.

The element 279 illuminates the photoconductive element 287 over the path 329, thus causing the resistance of the element 287 to decrease by a large amount. This reduces the potential difference between the point 293 and the conductor 284 and causes the electroluminescent element 290 to be extinguished. At the same time, since the photoconductive element 296 is illuminated by the electroluminescent element 326, which is in an "on" condition at the beginning of the cycle of operation, the electroluminescent element 298 is energized and illuminates the photoconductive element 282 in the output circuit, so that an output signal appears on the terminals 280, 281. The electroluminescent element 298 also illuminates the photoconductive element 288.

The extinguishing of the electroluminescent element 290 causes the illumination of the photoconductive elements 300 and 302 to be terminated. Since the photoconductive element 301 is also dark, the electroluminescent element 304, which was in an "on" condition at the beginning of the cycle of operation, is extinguished, thus terminating the illumination of the photoconductive elements 306 and 315. Termination of illumination of the photoconductive element 306 is effective to cause extinguishing of the electroluminescent element 307.

Since the photoconductive element 318 has slow response characteristics, its resistance will gradually increase, thus gradually increasing the potential difference between the conductor 284 and the common points 312, 313, and 314. The rate of increase of the effective resistance of the circuit combination consisting of the element 318, the variable resistor 317, and the element 315 is dependent upon the intensity of radiation emitted by the electroluminescent element 307 as controlled by the variable resistor 305, the response speed of the elements 315 and 318, the setting of the variable resistor 317, and the adjustment of the mask 339, which can be shifted to allow a greater or lesser amount of radiation to impinge on the element 318 from the element 307. When the potential difference between the conductor 284 and the common points 312, 313, and 314 is sufficiently large, the electroluminescent element 319, which was in an "on" condition at the commencement of the cycle of operation, will be extinguished, while the electroluminescent element 316, which was in an "off" condition at the commencement of the cycle of operation, will be energized, as shown by the respective wave forms in FIG. 16.

Energization of the electroluminescent element 316 illuminates the photoconductive element 325 over the path 341, thus causing the resistance of the element 325 to be decreased, so that the potential difference between the common points 324, 323 and the conductor 284 also decreases. This decrease in potential is sufficient to cause the electroluminescent element 326, which was in an "on" condition at the commencement of the cycle of operation, to be extinguished, while the electroluminescent element 321, which was in an "off" condition at the commencement of the cycle of operation, is energized. The respective energization and de-energization of the elements 321 and 326 is accelerated by the feed-back action between these elements and their respective photoconductive elements 327 and 322. As the electroluminescent element 326 is extinguished, the illumination which it affords to the photoconductive element 322 over the path 345 is decreased, so that the element 322 goes dark, and its resistance increases, thus hastening the de-energization of the element 326. Conversely, as the electroluminescent element 321 is energized, it illuminates the photoconductive element 327, which is in series with the photoconductive element 328 illuminated by the electroluminescent element 279. This illumination of the element 327 decreases its resistance and tends to accelerate the energization of the element 321. The elements 321 and 326 are optically coupled to the photoconductive elements 299 and 296, respectively, over the paths 342 and 344. Therefore it will be seen that as the element 321 is energized, it illuminates the photoconductive element 299 and decreases its resistance. This causes the electroluminescent output element 298 to be de-energized, thereby terminating its illumination of the photoconductive output element 282 and terminating the output signal which appears on the terminals 280, 281. At the same time, the photoconductive element 296 is darkened, due to the extinguishing of the electroluminescent element 326, and this is effective to cause the electroluminescent element 297 to be energized.

Energization of the element 297 illuminates the photoconductive element 301, thereby energizing the electroluminescent element 304. The element 304 in turn illuminates the photoconductive element 315 and thus causes the potential difference between the common points 312, 313, and 314 and the conductor 284 to begin to decrease. Such action is effective to extinguish the electroluminescent element 316 and to re-energize the electroluminescent element 319. At the same time, the element 304 also illuminates the photoconductive element 306, which effects the energization of the electroluminescent element 306, which in turn illuminates the photoconductive element 318. Examination of the wave forms relating to these two elements in FIG. 16 shows that this reversing action takes place before the elements have completely shifted from one state to the other, thus causing them to return to the state in which they were at the commencement of the cycle of operation of the circuit of FIG. 15.

No change in the condition of the various elements of the circuit of FIG. 15 takes place now until the termination of the input signal, as shown in the wave forms of FIG. 16. When the input signal is terminated, the electroluminescent element 279 is extinguished, and the photoconductive elements 287 and 328 are no longer illuminated. The resulting increase in resistance of the photoconductive element 287 causes the energization of the electroluminescent element 290 and the de-energization of the electroluminescent element 297. This process is accelerated by the feed-back action between the electroluminescent element 290 and the photoconductive element 300, which is serially connected to the element 290 between the two conductors 283 and 284.

At the same time, the increase in resistance of the photoconductive element 328 is effective to cause de-energization of the electroluminescent element 321 and re-energization of the electroluminescent element 326. The changes in condition of these two electroluminescent elements are hastened by the feed-back action previously mentioned between these elements and their corresponding photoconductive elements 327 and 322.

The various components of the circuit of FIG. 15 are thus restored to the condition in which they were at the commencement of the cycle of operation, and are ready to receive another input signal, at which time the cycle is repeated. In the event of an input signal which is of relatively short duration, as shown on the right side of FIG. 16, the cycle of operation is quite similar, with the various elements having conditions throughout the cycle as shown by the various wave forms.

It will be seen from the above description, and the accompanying drawings, that a plurality of different embodiments of an electro-optical multivibrator have been provided, with the various embodiments having varying degrees of complexity, and varying degrees of versatility, with respect to the permissible differences in the duration of output signal which they are capable of producing.

While the forms of mechanism shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. A monostable electro-optical device capable of producing an output signal of a given duration in response to an input signal which may be of varying duration, comprising, in combination, radiation-emissive signal input means;

radiation-sensitive signal output means;

a first radiation-emissive element optically coupled to the signal output means and capable of emitting radiation to said signal output means to cause a signal to be developed thereon;

first operating means associated with the first radiation-emissive element to cause said element to emit radiation in response to an emission of radiation from the signal input means;

a second radiation-emissive element controlled by said first operating means; and second operating means including first and second parallel-connected electro-optical pairs of elements, each pair consisting of a further radiation-emissive element and a further radiation-sensitive element, associated with the second radiation-emissive element and operable to control the first radiation-emissive element to terminate the emission of radiation thereby after a predetermined interval of time.

2. The device of claim 1, also including masking means associated with the second radiation-emissive means to control the transmission of radiation to the second operating means to thereby control the duration of the output signal.

3. A monostable electro-optical device capable of producing an output signal of a given predetermined duration in response to an input signal which may be of varying duration, comprising, in combination,
  at least five electrically distinct connection points;
  means for connecting a source of energy to a first and fourth of said points;
  a first electroluminescent element and first and second photoconductive elements connected in parallel between the first and a second of said points;
  a second electroluminescent element and third and fourth photoconductive elements connected in parallel between said second point and a third of said points;
  a fifth photoconductive element connected between said first and said third points;
  a third electroluminescent element and sixth and seventh photoconductive elements connected in parallel between said third and a fourth of said points;
  a fourth electroluminescent element and an eighth photoconductive element connected in parallel between said fourth and a fifth of said points; and
  a fifth electroluminescent element and a ninth photoconductive element connected in parallel between said fifth and said first of said points,
  the sixth photoconductive element providing a signal input means, the first electroluminescent element providing a signal output means and being optically coupled to the third and the seventh photoconductive elements, the second electroluminescent element being optically coupled to the first photoconductive element, the third electroluminescent element being optically coupled to the fifth and eighth photoconductive elements, the fourth electroluminescent element being optically coupled to the second and the ninth photoconductive elements, and the fifth electroluminescent element being optically coupled to the fourth photoconductive element.

4. The device of claim 3, also having means to selectively control the amount of radiation transmitted from the third electroluminescent element to the eighth photoconductive element to vary the duration of the output signal.

5. The device of claim 3, also including an electroluminescent input means optically coupled to the sixth photoconductive element, and a photoconductive output element optically coupled to the first electroluminescent element.

6. A monostable electro-optical device capable of producing an output signal of a selectively variable duration in response to an input signal which may be of varying duration, comprising, in combination,
  at least five electrically distinct connection points;
  means for connecting a source of energy to a first and fourth of said points;
  a first electroluminescent element and first and second photoconductive elements connected in parallel between the first and a second of said points;
  a second electroluminescent element and third and fourth photoconductive elements connected in parallel between said second point and a third of said points;
  a fifth photoconductive element connected between said first and said third points;
  a third electroluminescent element and sixth and seventh photoconductive elements connected in parallel between said third and a fourth of said points;
  a fourth electroluminescent element and eighth and ninth photoconductive elements connected in parallel between said fourth and a fifth of said points, a variable resistance for altering the duration of the output signal being connected in series with the ninth photoconductive element between said fourth and fifth points, the eighth photoconductive element having a substantially faster response time than the ninth photoconductive element; and
  a fifth electroluminescent element and a tenth photoconductive element connected in parallel between said fifth and said first of said points,
  the sixth photoconductive element providing a signal input means, the first electroluminescent element providing a signal output means and being optically coupled to the third and the seventh photoconductive elements, the second electroluminescent element being optically coupled to the first photoconductive element, the third electroluminescent element being optically coupled to the fifth, eighth, and ninth photoconductive elements, the fourth electroluminescent element being optically coupled to the second and the tenth photoconductive elements, and the fifth electroluminescent element being optically coupled to the fourth photoconductive element.

7. The device of claim 6, also having means to selectively control the amount of radiation transmitted from the third electroluminescent element to the ninth photoconductive element to vary the duration of the output signal.

8. The device of claim 6, also including an electroluminescent input means optically coupled to the sixth photoconductive element and a photoconductive output means optically coupled to the first electroluminescent element.

9. A monostable electro-optical device capable of producing an output signal of a selectively variable duration in response to an input signal which may be of varying duration, comprising, in combination,
  at least seven electrically distinct connection points;
  means for connecting a source of energy to a first and third of said points;
  a first electroluminescent element and a first photoconductive element connected in parallel between the first and a second of said points;
  a second electroluminescent element, a series combination of a second and a third photoconductive element, and a fourth photoconductive element connected in parallel between said second and third of said points;
  a capacitive element and a fifth photoconductive element connected in parallel between said first and a fourth of said points;
  a third electroluminescent element, a sixth photoconductive element, and a series combination of a variable resistance and a seventh photoconductive element connected in parallel between said third and fourth points, the variable resistance being operable to alter the duration of the output signal, the sixth photoconductive element having a substantially faster response time than the seventh photoconductive element;
  eighth and ninth photoconductive elements connected in parallel between said first point and a fifth one of said points;
  a fourth electroluminescent element connected between said third and fifth points;
  a fifth electroluminescent element, a tenth photoconductive element, and an eleventh photoconductive element connected in parallel between said third point and a sixth of said points;
  a twelfth photoconductive element connected between said first and said sixth points;

a thirteenth photoconductive element and a sixth electroluminescent element connected in parallel between said sixth and a seventh of said points; and a seventh electroluminescent element and a fourteenth photoconductive element connected in parallel between said seventh and said first points, the third and eleventh photoconductive elements providing signal input means, the seventh electroluminescent element providing a signal output means and being optically coupled to the tenth photoconductive element, the first electroluminescent element being optically coupled to the second and fourteenth photoconductive elements, the second electroluminescent element being optically coupled to the first and thirteenth photoconductive elements, and the third electroluminescent element being optically coupled to the fourth and fifth photoconductive elements, the fourth electroluminescent element being optically coupled to the sixth and seventh photoconductive elements, the fifth electroluminescent element being optically coupled to the eighth and twelfth photoconductive elements, and the sixth electroluminescent element being optically coupled to the ninth photoconductive element.

10. The device of claim 9, also having means to selectively control the amount of radiation transmitted from the fourth electroluminescent element to the seventh photoconductive element to vary the duration of the output signal.

11. The device of claim 9, also including an electroluminescent input means optically coupled to the third and eleventh photoconductive elements and a photoconductive output means optically coupled to the seventh electroluminescent element.

12. A monostable electro-optical device capable of producing an output signal of selectively variable duration in response to an input signal which may be of varying duration, comprising, in combination, at least seven electrically distinct connection points;

means for connecting a source of energy to a first and third of said points;

at first electroluminescent element and a first photoconductive element connected in parallel between the first and a second of said points;

second and third photoconductive elements in series, a fourth photoconductive element, and a second electroluminescent element connected in parallel between said second and third of said points;

a fifth photoconductive element and a capacitive element connected in parallel between said first point and a fourth of said points;

a third electroluminescent element, a sixth photoconductive element, and a serial combination of a seventh photoconductive element and variable resistance which may be used to vary the duration of the output signal connected in parallel between said fourth point and said third point, the sixth photoconductive element having a substantially faster response time than the seventh photoconductive element;

a variable resistance, an eighth photoconductive element, and a fourth electroluminescent element connected in series between said first and said third points;

a ninth and a tenth photoconductive element connected in parallel between said first point and a fifth of said points;

a fifth electroluminescent element connected between said third and fifth points;

a sixth electroluminescent element, an eleventh photoconductive element, and a twelfth photoconductive element connected in parallel between said third point and a sixth of said points;

a thirteenth photoconductive element connected between said first and sixth points;

a seventh electroluminescent element and a fourteenth photoconductive element connected in parallel between said sixth and a seventh of said points; and a fifteenth photoconductive element and an eighth electroluminescent element connected in parallel between said seventh and said first points, the third and twelfth photoconductive elements providing signal input means, the eighth electroluminescent element providing signal output means and being optically coupled to the eleventh photoconductive element, the first electroluminescent element being optically coupled to the second and fifteenth photoconductive elements, the second electroluminescent element being optically coupled to the first and fourteenth photoconductive elements, the third electroluminescent element being optically coupled to the fourth and fifth photoconductive elements, the fourth electroluminescent element being optically coupled to the seventh photoconductive element, the fifth electroluminescent element being optically coupled to the sixth and eighth photoconductive elements, the sixth electroluminescent element being optically coupled to the ninth and thirteenth photoconductive elements, and the seventh electroluminescent element being optically coupled to the tenth photoconductive element.

13. The device of claim 12, also having means to selectively control the amount of radiation transmitted from the fourth electroluminescent element to the seventh photoconductive element to vary the duration of the output signal.

14. The device of claim 12, also including an electroluminescent input means optically coupled to the third and twelfth photoconductive elements and a photoconductive output means optically coupled to the eighth electroluminescent element.

References Cited in the file of this patent

UNITED STATES PATENTS

| 2,727,683 | Allen et al. | Dec. 20, 1955 |
| 2,896,086 | Wunderman | July 21, 1959 |
| 2,904,697 | Halsted | Sept. 15, 1959 |
| 3,029,353 | Gold et al. | Apr. 10, 1962 |
| 3,042,807 | Vize | July 3, 1962 |